June 30, 1964
R. H. WISE
3,138,817
WINDSHIELD WIPER BLADE
Filed Aug. 14, 1961
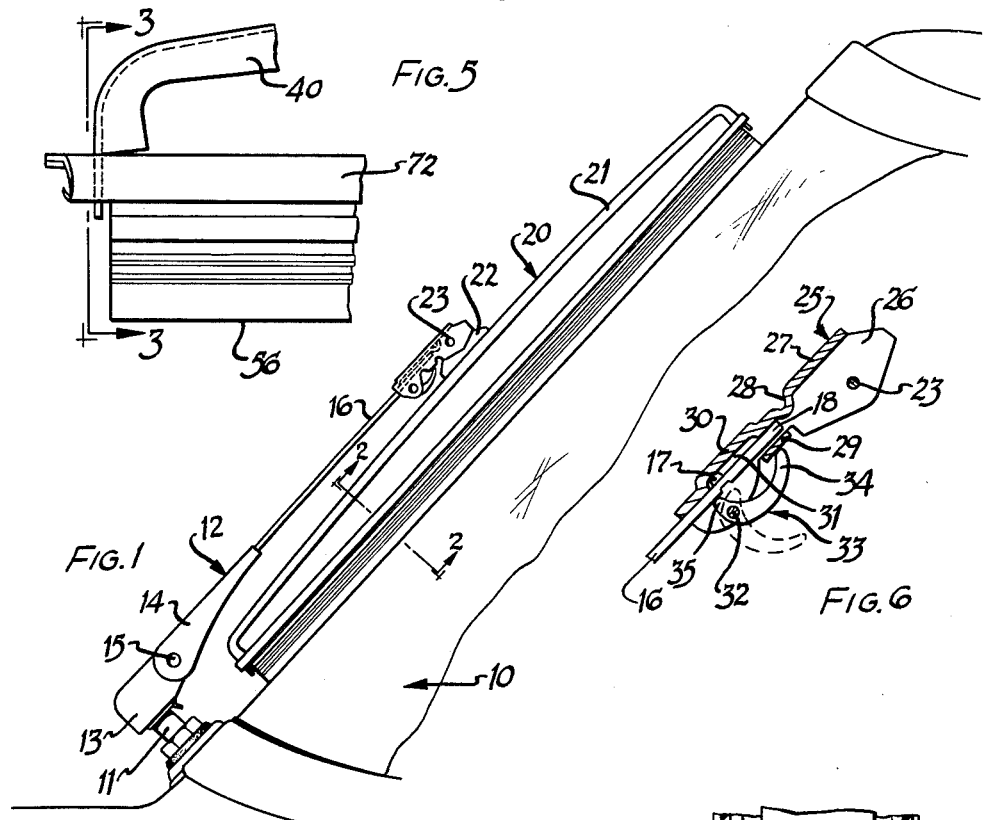
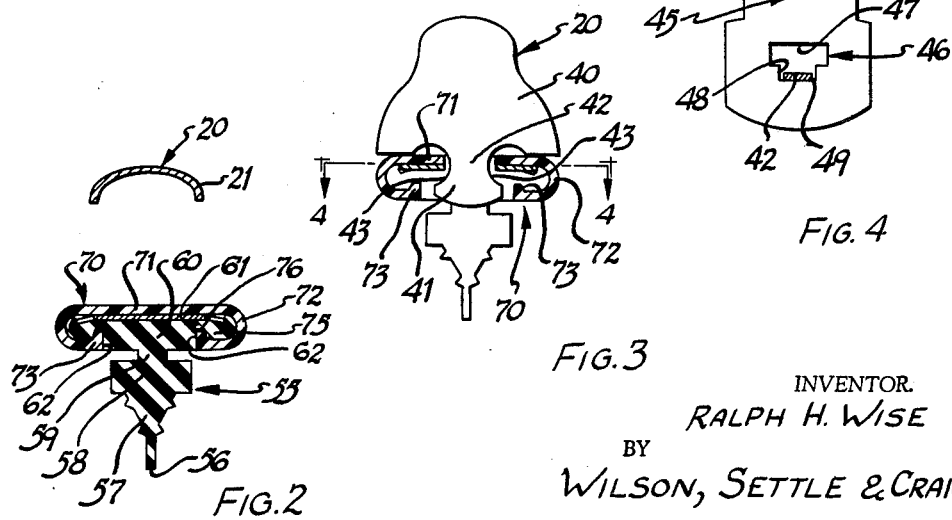
INVENTOR.
RALPH H. WISE
BY
WILSON, SETTLE & CRAIG
ATTORNEYS

United States Patent Office 3,138,817
Patented June 30, 1964

3,138,817
WINDSHIELD WIPER BLADE
Ralph H. Wise, 211 N. Church St., Dyersburg, Tenn.
Filed Aug. 14, 1961, Ser. No. 131,147
9 Claims. (Cl. 15—250.42)

The present invention relates to a windshield wiper blade.

The present automotive windshields are substantially curved, both transversely and vertically, to present a convex exterior surface which can best be wiped by a resilient rubber wiping edge. Such resilient rubber wiping edges are conventionally presented by elongated rubber wiping elements secured to a superstructure by means of which the wiping element is attached to an oscillating wiper arm for movement therewith.

In the present-day, conventional wipers, the resilient wiping element is supported by spaced metallic strips disposed in oppositely opening side grooves formed in the wiping element, these metallic strips being engaged by the blade superstructure. Various complicated and expensive arrangements have been provided for attaching the superstructure to the metallic strips and to insure retention of the strips in the resilient wiping element. All of these arrangements heretofore proposed suffer from several disadvantages, primarily in the possibility of scratching of the windshield surface by the metallic strips in the event of excessive wiping element "lay-over" and in the necessity for firmly securing the superstructure to the metallic strips at various points along the length of the wiping element.

The present invention now proposes a new and novel windshield wiper blade wherein any possibility of contact between the metallic backing strip and the windshield surface is prohibited, wherein a single metallic backing strip of enhanced lateral stability (to prevent excessive "lay-over") and wherein the blade structure is of extremely simple and inexpensive construction.

Generally, a windshield wiper blade of the present invention comprises an elastomeric wiping element having a thin wiping edge for contacting the glass surface to be wiped, a medial hinge section about which the wiping edge is laterally deflectible as the blade traverses the glass to be wiped, and a laterally enlarged securing flange remote from the wiping edge. Overlying the securing flange to be substantially coextensive therewith and in flatwise contact therewith is a backing strip. This backing strip is of substantially greater width than thickness, so as to be flexible in a direction toward and away from the surface to be wiped, yet rigid in planes parallel to the surface.

The backing strip is secured to the wiping element, or more accurately to the securing flange of the wiping element, by means of a cover element substantially coextensive with the backing strip and of generally U-shape. This retainer or cover is provided with a planar bight portion in flatwise contact with the backing strip and with inturned marginal flanges which interlockingly engage the support flange of the wiping element.

Thus, the wiping element, backing strip, and retaining cover form a telescopic assembly of only three parts but providing the wiping edge, the wiping element stabilizing backing strip and the means securing the backing strip and the wiping element in assembly.

The blade-supporting superstructure preferably takes the form of a single element bow having a medial portion spaced from the backing strip and down-turned end portions engaging the backing strip adjacent the remote ends thereof to suspend the backing strip under tension of the bow. Other superstructures of the "whiffle-tree," yoke, or linkage type may be utilized as desired, the superstructure engaging the backing strip to thereby urge the wiping element into wiping contact with the windshield surface.

Additionally, the present invention provides a new and novel, extremely simple blade-to-arm securing means including a connecting element pivotally attached to the blade and having an elongated socket into which the end of the actuating arm is inserted. An over-center lever is carried by the connector adjacent the socket for pivotal movement into engagement with the arm to urge an arm projection into a recess formed on the connector.

It is, therefore, an important object of the present invention to provide a new and improved windshield wiping blade of extremely simple, inexpensive, fool-proof design.

Another important object of this invention is the provision of a windshield wiping blade wherein an elastomeric wiping element is provided with a stabilizing backing strip secured to the wiping element by a cover urging the backing strip against the wiping element and interlocked with the wiping element to trap the backing strip therebetween.

It is a further important object of this invention to provide an improved windshield wiper blade in which a wiping element is provided with an enlarged securing flange in flatwise abutment with a metallic backing strip, the backing strip and wiping element being secured together by means of an extruded retainer of inverted U-shape.

Yet another, and no less important, object of the present invention is the provision of a windshield wiper blade wherein a wiping element is stabilized by a metallic backing strip retained in flatwise engagement with the wiping element by an elongated integrally formed retainer of plastic material, the retainer being interlocked with the wiping element to secure the backing strip thereto.

It is a still further object of this invention to provide an improved arm-blade connector wherein a pivoted lever is utilized to secure the free end of an actuating arm in a connector recess.

Other objects of this invention will appear in the following description and appended claims, reference being had to the accompanying drawings forming a part of this specification wherein like reference characters designate corresponding parts in the several views.

On the drawings:

FIGURE 1 is a side elevational view of a windshield wiping blade of the present invention;

FIGURE 2 is an enlarged sectional view taken along the plane 2—2 of FIGURE 1;

FIGURE 3 is an enlarged end view of the blade taken along the plane 3—3 of FIGURE 5;

FIGURE 4 is a sectional view taken along the plane 4—4 of FIGURE 3;

FIGURE 5 is a fragmentary side elevational view of an end of the windshield wiper blade; and FIGURE 6 is a sectional view taken along a vertical plane through the arm-to-blade connector of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to an automotive windshield.

Positioned beneath the lower edge of the windshield 10 is a pivot shaft 11 oscillatable about its longitudinal axis by a suitable drive means, such as a pneumatic motor, an electric motor, or a hydraulic motor.

Mounted on the pivot shaft 11 for oscillation therewith is a wiper arm 12 comprising a socket portion 13 fixed to the pivot shaft for oscillation therewith and a radially extending stamped arm base 14 pivotally secured to the socket 13, as by pivot pin 15. The arm base 14 and the socket 13 are joined by suitable means, such as a coiled tension spring, to urge the outer end of the arm 12 toward the windshield 10, as is well known in the art. That end 16 of the arm 12 remote from the socket 13 is provided with a raised projection 17 spaced from the terminal end 18 thereof.

The blade 20 is provided with a superstructure in the form of a bow 21 upon which is fixedly mounted a medially located upstanding attachment bracket 22 secured, as by a pivot pin or rivet 23, to a connector indicated generally at 25. The connector comprises a pair of side plates 26 straddling the bracket 22 and secured thereto by the rivet 23. The side plates 26 are joined by an upper web 27 having a dimple or depression 28 located medially thereof and by a pair of lower inturned ears 29.

The upper web 27 cooperates with the side plates 26 and with the lower ears 29 to define an open ended socket into which the free end 18 of the arm can be freely inserted. That portion of the web 27 overlying this socket is elevated, as at 30, to define an open bottomed slot 31 of a size to receive the arm projection 17. The side plates 26 carry, at their rear ends, a transverse pivot pin 32 upon which is mounted a pivotal lever 33. This lever has an elongated handle 34 at one extremity thereof and a short camming nose 35 at the other extremity thereof. When the lever is pivoted to its dotted position of FIGURE 6, the free end of the arm 18 is freely received within the socket with the projection 17 being enterable into the slot 33. When the arm is pivoted to its solid line position, the cam nose 35 thereof contacts the undersurface of the arm and urges the arm upwardly against the undersurface of the web 25 with the projection 17 being entered in the slot 31.

As best shown in FIGURES 3 and 5 of the drawings, the yoke 21 has a bowed medial portion terminating in downturned ends 40. The bow 21 is preferably drawn or formed from sheet metal stock and is of arcuate cross-section (FIGURE 2) and the extremity of each of the ends 40 is cut away to provide a tongue 41 of substantial lateral extent and joined to the bow end 40 through a reduced throat portion 42 defined intermediate arcuate recesses 43.

Secured to the ends 40 of the bow 20 is a longitudinally extending metallic support strip 45, this support strip being of appreciable width and formed of relatively thin stock. The extremities of the strip 45 are provided with keyhole apertures 46 comprising an aperture portion 47 joined to a reduced aperture portion 48 having an end abutment surface 49 against which the throat 42 of the bow end 40 abuts after the enlarged end 41 has been inserted through the enlarged aperture 47.

The strip 45 is of such length, i.e. the distance between the abutment surfaces 49, that the strip 45 is placed under tension upon assembly to the ends of the bow 20. In other words, the bow is deflected from its relaxed position during assembly and, upon the release of the bow, abutment of the bow ends with the abutment surfaces 49 tensions the strip 45 therebetween.

As best illustrated in FIGURE 2 of the drawings, the strip 45 is essentially planar in configuration and is maintained in this planar configuration by the tension of the bow 20. The longitudinal edges of the strip 45 intermediate the apertures 46 are provided with downturned faced ears 50 for a purpose to be hereinafter more fully described. These ears being deflected downwardly from the plane of the strip 45.

As illustrated in FIGURE 2 of the drawings, the strip 45 is superimposed on and in flat face-to-face contact with an elastomeric wiping element 55. This wiping element 55 is preferably formed of rubber or a like elastomeric compound and has a relatively thin glass-contacting wiping edge 56 joined through a tapered joining portion 57 to an enlarged stabilizing section 58. This stabilizing section 58 is joined through a reduced throat portion 59 to an upper support flange or portion 60. This upper support portion 60 is transversely enlarged and is provided with a planar upper surface 61 against which the undersurface of the strip 50 abuts. Additionally, the undersurface of the flange is provided with a pair of downwardly opening grooves 62 which are spaced transversely from one another and which extend longitudinally throughout the length of the elastomeric wiping element 55.

The elastomeric wiping element 55 and the support strip 45 are secured together by means of a retainer element indicated generally at 70. This retainer element 70 is of generally inverted U-shape having an upper, substantially planar web portion 71 joined to depending arm portions 72 wrapping about the longitudinal marginal portions of the wiping element support flange 60 and terminating in upwardly projecting flanges 73 entered in the slots 62.

Thus, the envelope 70 serves to secure the elastomeric wiping element 55 and the strip 45 in assembly. Further, the presence of the downwardly opening grooves 62 and the upwardly projecting terminal flanges 73 results in the lateral extremities of the element attaching flange 60 being of bulbous shape, as at 75, and joined to the remainder of the flange 60 through the reduced throat 76 defined between the overlying strip 45 and the flanges 73 to prevent passage of the bulbous ends 75 through this restricted area. The envelope 70 prevents withdrawal of the elastomeric element from the assembly, even though the thin wiping edge 52 may be firmly adhered to the windshield, as by freezing thereto.

The envelope 70 is of constant cross-section throughout its length and is coextensive with the strip 45 (FIGURE 5), the envelope being cut to the contour of the keyhole slots 46 to accommodate the entry of the ends 41 of the bow 21 therethrough. The downturned ears 50 of the strip 45 are separate from one another and project laterally beyond the medial portions of the strip, so as not to inhibit flexibility of the strip toward and away from the windshield 10 while at the same time securely interlocking the strip and the elastomeric element 55. The strip 45 and the envelope 70 are substantially coextensive with the elastomeric wiping element 55 and project therebeyond only through that distance necessary for the keyhole slots 46 in order to accommodate the entry of the ends of the bow 21 through the slots. Thus, as best seen in FIGURE 3 of the drawings, the lower ends 41 of the bow overlie the ends of the wiping element 55 and prevent longitudinal displacement or centrifugal throwing of the elastomeric wiping element from the assembly.

Preferably, the envelope is formed of a synthetic resinous material, suitable materials including Cycolac, Kralastic and Tenite. Such materials possess the necessary structural rigidity so that the upturned ears or flanges 73 will retain the strip 45 and the wiping element 55 in assembly, and yet are of sufficient flexibility so as not to inhibit conformation of the assembly to a curved windshield surface.

Having thus described my invention, I claim:

1. A windshield wiper blade comprising an elongated rubber wiping element having a deflectible wiping edge, an integral flexing hinge portion and an integral relatively wide support flange; a thin resiliently distortable metallic backing strip in flatwise contact with the support flange of the wiping element and substantially coextensive therewith, an elastomeric envelope of inverted U shape having an upper substantially planar portion overlying the metallic backing strip and depending arm portions wrapping about the longitudinal marginal portions of the wiping element securing together the wiping element and the metallic backing strip, and a pressure-transmitting superstructure engaging the metallic backing strip.

2. In a windshield wiper blade having an elastomeric wiping element including a securing flange and a resiliently distortable metallic backing strip contacting the flange of the wiping element to support the element against torsional deflection, the improvement of a cover formed of synthetic resinous material having a medial portion overlying the backing strip to urge the strip against the flange of said element and end flanges interlocked with the wiping element flange to secure the backing strip and wiping element in assembly.

3. A windshield wiper blade comprising an elongated rubber wiping element having a wiping edge, a thin resiliently distortable backing strip substantially coextensive with the wiping element and in flatwise contact with that surface of the wiping element opposite to the wiping edge, a plastic retainer longitudinally coextensive with the backing strip, and said retainer being of substantially uniform cross-section to define a bight portion trapping the metallic backing strip against the wiping element surface and inturned terminal flanges engaging the wiping element, and a pressure-transmitting superstructure engaging the metallic backing strip.

4. In a windshield wiper blade, a pressure transmitting superstructure and a wiping element assembly comprising an elastomeric wiping element including a securing flange, a resiliently distortable metallic backing strip contacting the flange of the wiping element to support the element against torsional deflection, and a cover formed of synthetic resinous material, said cover telescopically enclosing the backing strip and a portion of the wiping element and being interlocked with the wiping element flange to secure the backing strip to wiping element in assembly, and a pressure transmitting superstructure comprising a bow having end engaging means with the metallic backing strip entrapping the synthetic resinous cover and restraining it from longitudinal movement.

5. In a windshield wiper blade having an elastomeric wiping element including a securing flange, a resiliently distortable metallic backing strip contacting the securing flange of the wiping element to support the element against torsional deflection, and a pressure-transmitting superstructure engaging the backing strip, the improvement of a plastic retainer having a medial portion urging the strip against the flange of said element and end flanges engaging the wiping element flange in opposition to the backing strip to secure the backing strip and wiping element in assembly.

6. A windshield wiper blade comprising an elongated rubber wiping element having a deflectible wiping edge, an integral flexing hinge portion and an integral relatively wide support flange, a thin resiliently distortable metallic backing strip in flatwise contact with the support flange of the wiping element, the backing strip having its extreme longitudinal ends projecting beyond the wiping element flange, an elastomeric envelope of inverted U-shape securing together the metallic backing strip and the wiping element and having a bight portion coextensive with and overlying the metallic backing strip and inturned marginal flanges terminating in clinching edges interlocked with the element support flange, and a pressure-transmitting superstructure engaging only the longitudinal ends of the metallic backing strip and functioning to restrain longitudinal shifting of the elastomeric envelope.

7. In a windshield wiper blade, an elongated rubber wiping element having a deflectible wiping edge and an integral relatively wide support flange having longitudinal grooves opening toward the wiping edge, a non-metallic retainer of inverted U-shape substantially coextensive with the wiping element and having a bight portion overlying the element support flange and inturned marginal flanges entered in the grooves of the element support flange, a metallic backing strip snugly interposed between the retainer and the wiping element, and a pressure-transmitting superstructure engaging the metallic backing strip.

8. In a windshield wiper blade having an elongated rubber wiping element having a deflectible wiping edge, an integral flexing hinge portion and an integral relatively wide support flange; a thin resiliently distortable metallic backing strip in flatwise contact with the support flange of the wiping element and substantially coextensive therewith; and a pressure-transmitting superstructure engaging the remote ends only of the metallic backing strip; the improvements of an elastomeric envelope contacting the backing strip and the wiping element and securing them in assembled relation, the envelope being of inverted U-shape and having a bight portion overlying the metallic backing strip and inturned terminal flanges interlocked with the element support flange.

9. In a blade for wiping a curved windshield surface, an elastomeric wiping element and a backing strip deflectible in a plane normal to the windshield surface and rigid in planes parallel to the surface, the strip supporting the wiping element against torsional deflection, and a cover formed of resilient material having an upper planar portion engaging and overlying the backing strip to retain the backing strip against said wiping element under pressure and a bow having end portions interlocked with the backing strip to restrain the backing strip and wiping element from longitudinal shifting relative to each other.

References Cited in the file of this patent

UNITED STATES PATENTS

| | | |
|---|---|---|
| 2,659,097 | Morton | Nov. 17, 1953 |
| 2,691,790 | O'Shei | Oct. 19, 1954 |
| 2,727,271 | Oishei et al. | Dec. 20, 1955 |
| 2,798,242 | Zeininger | July 9, 1957 |
| 2,932,843 | Zaiger et al. | Apr. 19, 1960 |
| 2,956,299 | Ziegler | Oct. 18, 1960 |
| 2,958,892 | Ryck | Nov. 8, 1960 |
| 3,035,298 | Scinta | May 22, 1962 |